(12) United States Patent
Larsson

(10) Patent No.: US 7,201,153 B2
(45) Date of Patent: Apr. 10, 2007

(54) FUEL INJECTION SYSTEM FOR AN INTERNAL COMBUSTION ENGINE

(75) Inventor: Anders Larsson, Lerum (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 10/905,165

(22) Filed: Dec. 20, 2004

(65) Prior Publication Data

US 2005/0081831 A1 Apr. 21, 2005

Related U.S. Application Data

(63) Continuation of application No. PCT/SE03/00884, filed on May 28, 2003.

(60) Provisional application No. 60/389,737, filed on Jun. 19, 2002.

(30) Foreign Application Priority Data

Jun. 19, 2002 (SE) .................................. 0201901

(51) Int. Cl.
F02M 37/04 (2006.01)
(52) U.S. Cl. .................... 123/510; 123/196 A; 210/136
(58) Field of Classification Search ................ 123/510, 123/511, 514; 210/234, 235, 136
See application file for complete search history.

(56) References Cited

U.S. PATENT DOCUMENTS

| | | | | |
|---|---|---|---|---|
| 3,627,450 A | * | 12/1971 | Ward | ........................... 417/205 |
| 3,774,764 A | * | 11/1973 | Baldwin | ...................... 210/130 |
| 4,427,542 A | * | 1/1984 | Glover | ........................ 210/121 |
| 4,706,636 A | * | 11/1987 | Davis | .......................... 123/557 |
| 5,350,506 A | * | 9/1994 | Dombek et al. | ............ 210/136 |
| 5,534,161 A | | 7/1996 | Tarr et al. | |
| 6,053,334 A | * | 4/2000 | Popoff et al. | ............... 210/438 |
| 6,269,801 B1 | * | 8/2001 | Channing | ................... 123/516 |
| 6,328,883 B1 | * | 12/2001 | Jensen | ........................ 210/136 |
| 6,723,239 B2 | * | 4/2004 | Maxwell | ..................... 210/235 |
| 6,964,267 B2 | * | 11/2005 | Jin | ............................... 123/514 |
| 7,086,537 B2 | * | 8/2006 | Maxwell et al. | ............ 210/435 |
| 2004/0069700 A1 | * | 4/2004 | Miller et al. | ................. 210/235 |

FOREIGN PATENT DOCUMENTS

| | | |
|---|---|---|
| DE | 4014551 C1 | 12/1991 |
| EP | 0307739 A2 | 3/1989 |
| EP | 0964153 A2 | 12/1999 |

* cited by examiner

*Primary Examiner*—Thomas Moulis
(74) *Attorney, Agent, or Firm*—Novak Druce + Quigg, LLP

(57) ABSTRACT

Method and arrangement for providing a fuel system for an internal combustion engine (10) that includes a fuel tank (13), a fuel pump (12) and a fuel filter (19) located in a flow duct (14) between the fuel pump and the fuel consumers (11) of the engine. The flow duct (14) includes a valve chamber (20), located downstream of the fuel filter, and having a valve cone (24) movably arranged in the chamber between an upper valve seat (20*b*) and a lower valve seat (27). The upper part of the valve chamber (20) has an outlet (22) for bleeding to the fuel tank (13). The valve cone (24) is provided with an inner passage (25) with a valve seat (25*a*) which, under normal fuel pressure, interacts with a bleed cone (26) that is movable in the passage (25).

12 Claims, 3 Drawing Sheets

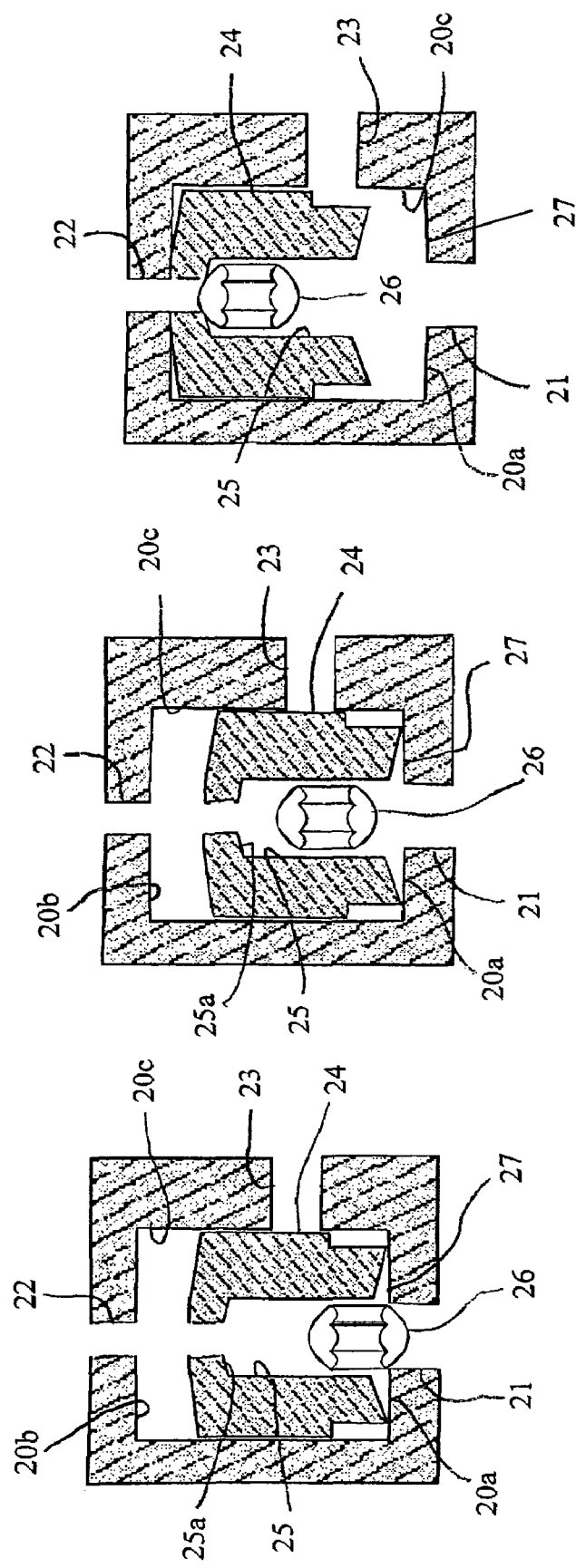

FUEL INJECTION SYSTEM FOR AN INTERNAL COMBUSTION ENGINE

CROSS-REFERENCE TO RELATED APPLICATIONS

The present application is a continuation patent application of International Application No. PCT/SE03/00884 filed 28 May 2003 which was published in English pursuant to Article 21(2) of the Patent Cooperation Treaty, and which claims priority to 1) Swedish Application No. 0201906-6 filed 19 Jun. 2002; and 2) U.S. Provisional Application No. 60/389,737 filed 19 Jun. 2002. Said applications are expressly incorporated herein by reference in their entireties.

TECHNICAL FIELD

The present invention relates to a fuel system for an internal combustion engine and that includes a fuel tank, a fuel pump and a fuel filter located in a flow duct between the fuel pump and the fuel consumers of the engine. The flow duct includes a valve chamber located downstream of the fuel filter and a valve cone arranged movably in the chamber between an upper valve seat and a lower valve seat.

BACKGROUND

Fuel systems for internal combustion engines are usually designed so that fuel filter exchange (replacement) involves emptying the fuel line between the outlet of the filter housing and the cylinder head. Because the fuel is an environmentally harmful substance, it is necessary that it be collected to avoid spillage. Such fuel filter exchange is a common service action, especially on heavy diesel engines that are used a great deal. It is usual for fuel systems for diesel engines to be provided with a bleed nipple and a hand pump which can be used when air bleeding and refilling of the drained line with fuel is carried out. Typically, before the engine is started after such a filter exchange, a large number of strokes of the hand pump are required, and it is necessary to open one or more bleed nipples in order to remove the quantity of air present in the new filter. This involves expensive workshop time and also a risk of fuel spillage because the abovementioned nipples are generally not closed before the fuel flows.

There are fuel systems with devices that can be used to automate the procedure for removing air (see, for example, U.S. Pat. No. 5,534,161). This patent describes a pump which can be driven in two directions by means of a microprocessor and that can be used for removing water from the fuel channel. This device, however, can only facilitate the procedure for bleeding air from the fuel system, and further actions are required in order to remove air from the high-pressure side of the system. Inclusion of this type of device therefore requires that the number of components in the fuel system be increased without fully solving the problem of facilitating the bleed procedure.

SUMMARY OF THE INVENTION

One object of the invention is therefore to provide a fuel system that makes possible automated removal of air after filter exchange without the system being made more complicated or expensive.

The fuel system designed for this purpose comprises (includes, but is not necessarily limited to) a fuel tank, a fuel pump and a fuel filter located in a flow duct between the fuel pump and the fuel consumers of the engine. The flow duct comprises a valve chamber, located downstream of the fuel filter, with a valve cone arranged movably in the chamber between an upper valve seat and a lower valve seat. Further, an upper part of the valve chamber has an outlet for bleed to the fuel tank and the valve cone is provided with an inner passage with a valve seat which, under normal fuel pressure, interacts with a bleed cone that is movable in the passage. On the one hand, this design of the fuel system ensures that fuel spillage during filter exchange is minimized, and, on the other hand, that subsequent bleeding of the fuel system can take place automatically.

BRIEF DESCRIPTION OF FIGURES

The invention will be described in greater detail below with reference to illustrative embodiments shown in the accompanying drawings, in which:

FIGS. 3–5 are diagrammatic views showing on further enlarged scale three different functional states of a valve chamber that forms part of the fuel system according to the invention.

DESCRIPTION OF ILLUSTRATIVE EMBODIMENTS

Figure 1:
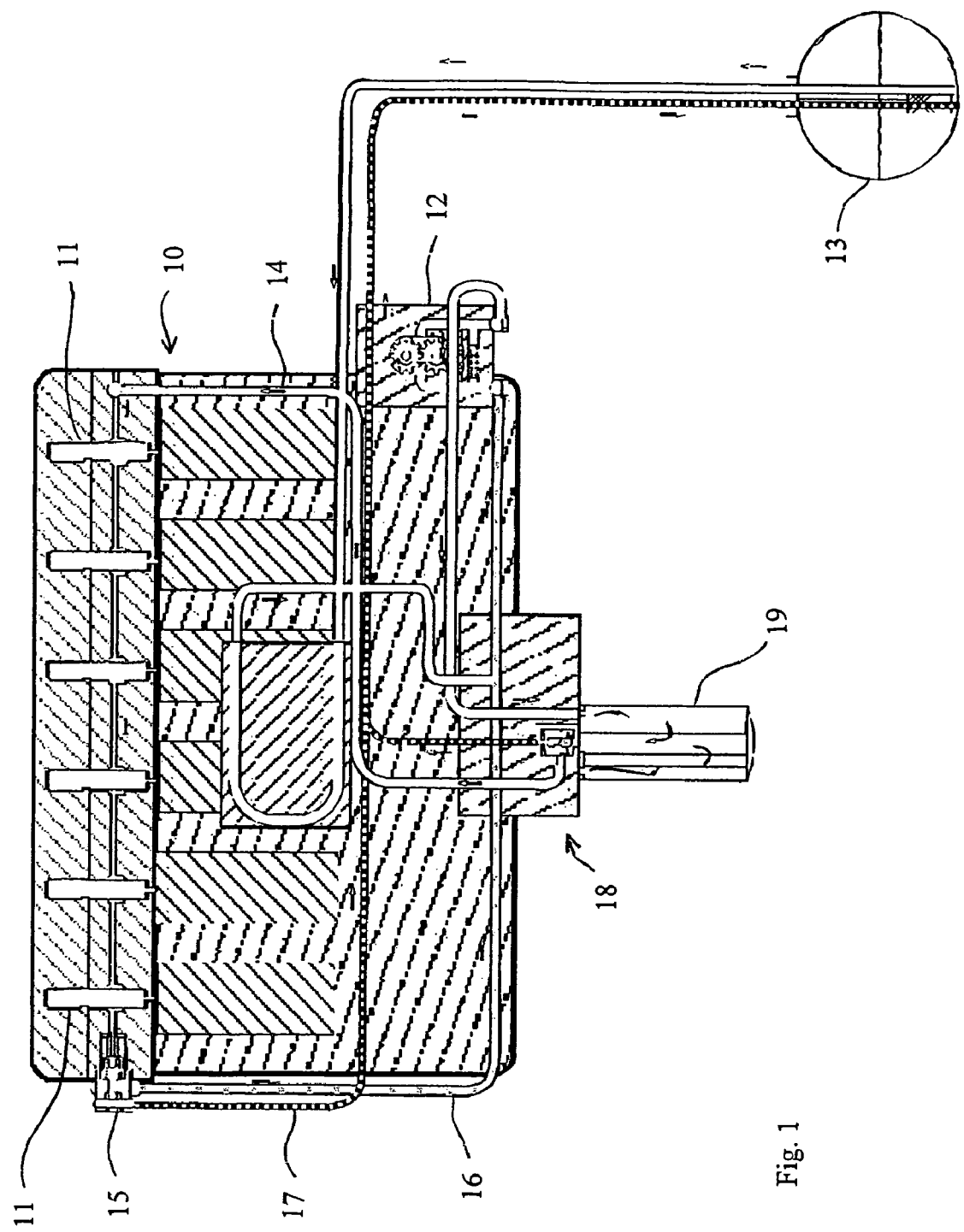
FIG. 1 is a diagrammatic view of an internal combustion engine with a fuel system configured according to the teachings of the present invention.

An internal combustion engine 10 is shown diagrammatically in FIG. 1 as a six-cylinder diesel engine with a corresponding number of injectors 11 of standard type. This engine can be used, for example, to drive a heavy truck.

Diesel fuel is fed by a pump 12 driven by the engine from a tank 13 via a common feeder line 14 to the injectors 11. A combination valve 15 for pressure control and bleeding is mounted downstream of the injectors 11. A return line 16 for uncombusted fuel is connected to the combination valve. A bleed line 17 is also connected to the combination valve, which bleed line communicates with the fuel tank 13.

Figure 2:
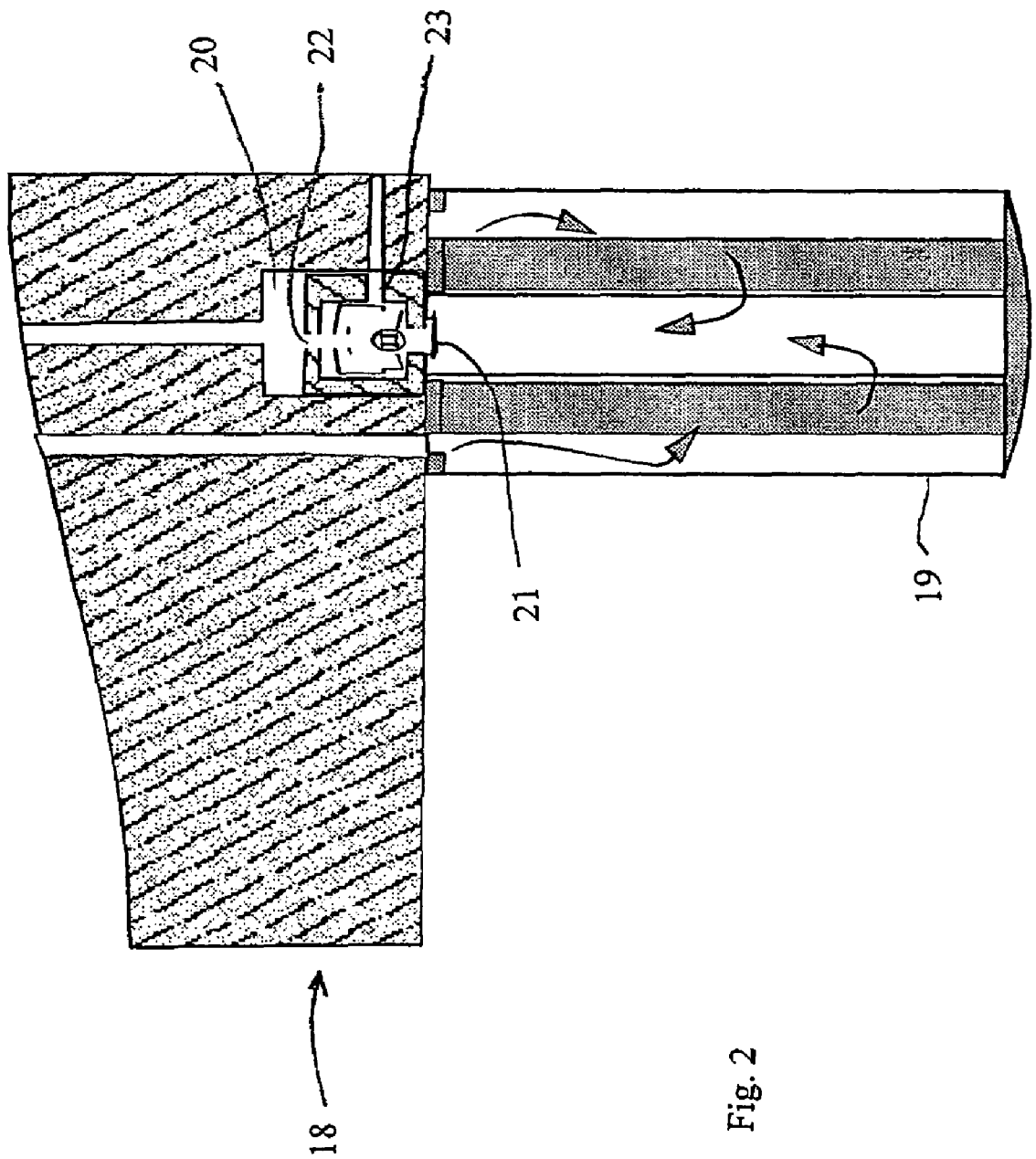
FIG. 2 is a diagrammatic view showing, on enlarged scale, a filter holder that forms part of the fuel system in FIG. 1, and includes an associated filter.

The fuel system also comprises a filter holder 18 with a fuel filter 19. The filter holder is shown in greater detail in FIG. 2 and is provided with a cylindrical valve chamber 20 that is located downstream of the fuel filter and is shown in greater detail in FIGS. 3–5.

The lower end wall 20a of the chamber is provided with a central inlet 21 from the fuel filter 19. Via a central outlet 22, the upper end wall 20b communicates fuel tank 13 via the bleed line 17. The also communicates with the feeder line 14 via a laterally directed outlet 23 arranged in the lateral surface 20c.

The valve chamber 20 accommodates a valve cone 24 which is provided with an inner passage 25 having a valve seat 25a and a bleed cone 26 that is movable in the passage. This bleed cone 26 is arranged to interact with a lower valve seat 27 of the valve chamber at low fuel pressure as depicted in FIG. 3. As fuel pressure increases (from the bottom direction), the bleed cone, which is considerably more freely moving than the valve cone 24, departs away from the valve seat 27 and air bubbles are then able to move past the bleed cone and out via the bleed port 22 as depicted in the configuration of FIG. 4. As shown between FIGS. 4 and 5, when the fuel pressure is sufficiently high, the bleed cone 26 interacts with (substantially seals upon) the upper valve seat 25a and the valve cone 24 moves from the valve seat 27 so that fuel can pass out through the outlet 23 to the feeder line 14.

From an operational perspective, when the engine is started after exchange of the fuel filter 19, the fuel pump 12 sucks fuel from the tank 13 and fills the filter 19. As the pressure in the filter becomes sufficiently great, the bleed cone 26 lifts from the valve seat 27 and entrained air passes through the central passage 25 of the valve cone 24, past the bleed cone, and on through the outlet 22. When the fuel reaches the valve chamber 20, the bleed cone closes on valve seat 25a and the valve cone 24 is displaced upward so that air-free fuel then starts to be pushed (flowed) to the consumers 11 of the engine via the outlet 23 to the feeder line 14.

The weight of the bleed cone 26 is adapted (selected) in such a way that air bubbles in the fuel easily lift the cone 26 from the lower valve seat 27. The weight of the valve cone 24 is in turn adapted in such a way that only the fuel pressure is capable of causing it to lift from the lower valve seat 27.

Because the bleed cone 26 is configured to rapidly close the inlet 21, a large part of the positive pressure in the feeder line 14 can be retained during filter exchange. This positive pressure is important for the engine's starting and continuing to run for the time it takes for all air to pass out through the bleed port 22, and after which the pressure again rises to a normal level which is maintained by the combination valve 15. The engine therefore runs even during the bleeding process because fuel still remains around the injectors 111 and in the fuel line 14 leading thereto. It should be appreciated that this assumes that the engine is running under low load; that is to say, with low fuel consumption which makes it possible for the pump to replace the air quantity present in the filter with fuel. Moreover, this bleeding process advantageously takes only about 10 seconds.

The invention is not to be regarded as being limited to the illustrative embodiments described above, but a number of further variants and modifications are conceivable while remaining within the scope of the following patented claims. For example, it is possible to use spring means that act in the closing direction as a supplement to the weight of the valve cone 24 and/or the bleed cone 26.

What is claimed is:

1. A fuel system for an internal combustion engine (10), said system comprising:
   a fuel tank (13);
   a fuel pump (12);
   a fuel filter (19) located in a flow duct (14) between said fuel pump and fuel consumers (11) of the engine, said flow duct (14) comprising a valve chamber (20) located downstream of said fuel filter;
   a valve cone (24) is movably arranged in said chamber between an upper valve seat (20b) and a lower valve seat (27) and an upper part of the valve chamber (20) has an outlet (22) for bleeding to the fuel tank (13);
   said valve cone (24) is provided with an inner passage (25) having a valve seat (25a) which, under normal fuel pressure, interacts with a bleed cone (26) that is movable within said passage.

2. The fuel system as recited in claim 1, wherein said bleed cone (26) is arranged to interact with said lower valve seat (27) of the valve chamber (20) when the fuel pressure is low.

3. The fuel system as recited in claim 2, wherein said bleed cone (26) is arranged to move from the lower valve seat (27) during bleeding, as the fuel pressure rises.

4. The fuel system as recited in claim 1, wherein said valve chamber (20) is cylindrically shaped with a lower end wall (20a) having a central inlet (21) from said fuel filter (19).

5. The fuel system as recited in claim 4, wherein said valve chamber (20) is provided with an upper end wall (20b) having a central outlet (22) to said fuel tank (13).

6. The fuel system as recited in claim 4, wherein a lateral surface (20c) of said valve chamber (20) is provided with a laterally directed outlet (23) leading to the fuel consumers (11) of the engine (10).

7. The fuel system as recited in claim 1, wherein said bleed cone (26) has a weight that enables said bleed cone (26) to be lift from said lower valve seat (27) under the influence of air bubbles entrained in the fuel during a fuel filter exchange procedure.

8. The fuel system as recited in claim 1, wherein said valve cone (24) has a weight that enables said valve cone (24) to be lift from said lower valve seat (27) under the influence of normal fuel pressure during engine operation.

9. The fuel system as recited in claim 1, wherein said valve cone (24) is acted on by a spring means which acts in a closing direction.

10. The fuel system as recited in claim 1, wherein said bleed cone (26) is acted on by a spring means which acts in a closing direction.

11. The fuel system as recited in claim 1, wherein said valve cone (24) and said bleed cone (26) are acted on by spring means which act in respective closing directions.

12. The fuel system as recited in claim 1, wherein said valve chamber (20) is located in a filter holder (18) in proximity to a connection for said fuel filter (19).

* * * * *